Jan. 9, 1945.  J. F. JOHNSON, JR  2,367,031
VOLUMETRIC MEASURING MACHINE
Filed Jan. 19, 1942  2 Sheets-Sheet 1
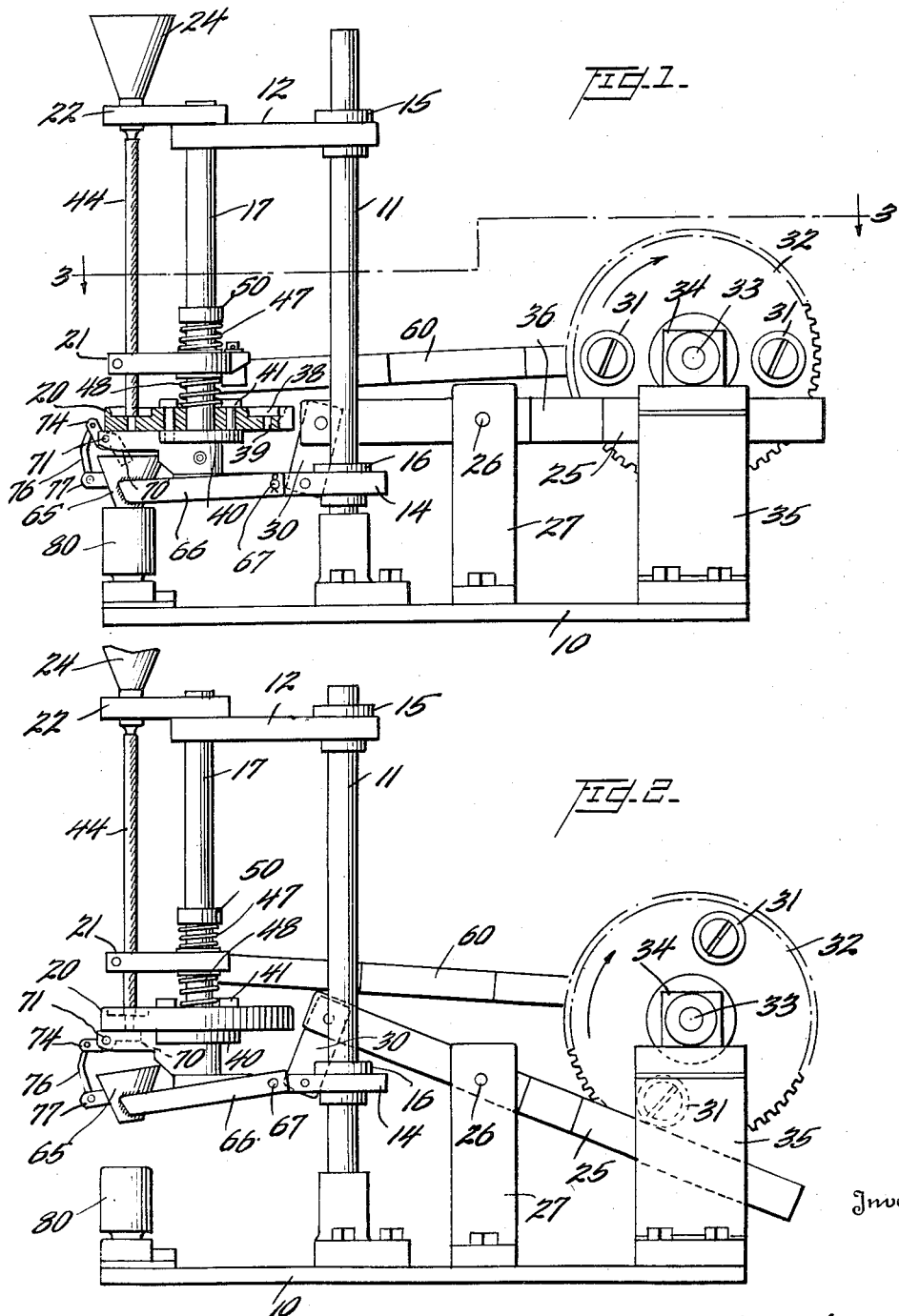

Jan. 9, 1945.  J. F. JOHNSON, JR  2,367,031
VOLUMETRIC MEASURING MACHINE
Filed Jan. 19, 1942   2 Sheets-Sheet 2
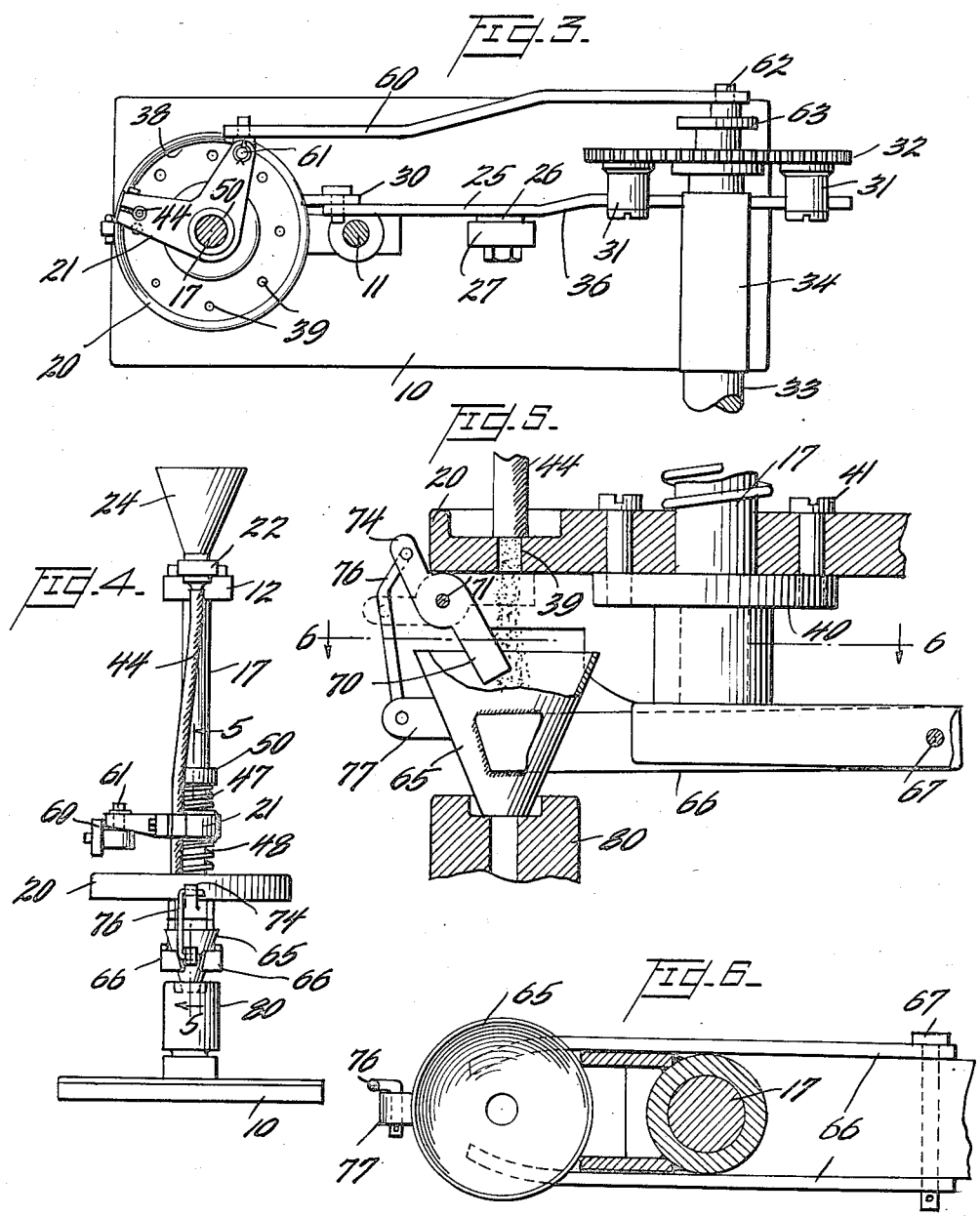

Patented Jan. 9, 1945

2,367,031

UNITED STATES PATENT OFFICE 2,367,031

VOLUMETRIC MEASURING MACHINE

John F. Johnson, Jr., North East, Md., assignor to Triumph Explosives, Inc., Elkton, Md., a corporation of Maryland Application January 19, 1942, Serial No. 427,395

10 Claims. (Cl. 86—1)

This invention relates to volumetric measuring apparatus and more particularly to such apparatus for measuring and delivering successive equal charges of fluent material from a suitable reservoir to a receptacle, the presence of which controls the discharge of the measured material.

It is a general object of the present invention to provide novel and improved apparatus of the type described.

More particularly it is an object of the invention to provide an apparatus for volumetrically measuring and delivering small quantities of highly sensitive explosive powder and for ensuring against the spillage of any of the material particularly in the event of the absence of a receptacle at the moment when discharge is indicated.

A major object of the invention consists in the provision of measuring and delivering apparatus for fluent powders in which a measuring trap is adapted for periodic cooperation with a source of powder for filling the same and in which a discharge guiding means is positioned to receive the measured charge from the trap and guide the same into a receptacle, together with a closure for the trap so associated with the guide means that the closure remains in closed position to hold the charge in the trap unless a receptacle is positioned to receive the same.

An important feature of the invention resides in the arrangement of a turret providing a plurality of traps of graduated size each adapted for selected positioning to be loaded from a reservoir of material and for cooperation with a bottom closure device adapted to close the trap during the filling operation.

Another important feature of the invention consists in the use of a conduit leading from the reservoir to the surface of the trap-containing plate and incorporating a mouth of flexible resilient material engaging the surface of the plate, together with means for imparting relative movement between the plate and the mouth along a path containing the upper port of the trap.

A further feature of the invention consists in the provision of a measuring and discharging device for explosive powders including means for periodically elevating the powder measuring apparatus, filling a measuring trap during the elevating phase of the cycle, discharging the trap on the downward phase of the cycle, and providing means to retain the trap closed on the downward phase in the absence of a receptacle for the material in the trap.

Other objects and features of the invention will be more apparent to those skilled in the art upon a consideration of the accompanying drawings and following specification, wherein is disclosed a single exemplary embodiment found satisfactory for the purpose, it being understood, however, that sundry changes and modifications may be made therein such as fall within the scope of the appended claims without departing from the spirit of the invention.

In said drawings:

Figure 1 is a side elevation, with a portion in central vertical section, showing the apparatus in material discharging position with a receptacle beneath the same;

Figure 2 is a view similar to Figure 1 but showing the whole apparatus in side elevation and in the material loading position;

Figure 3 is a top plan view, partly in horizontal section, taken on line 3—3 of Figure 1;

Figure 4 is a front elevation with the apparatus in the position illustrated in Figure 1;

Figure 5 is a fragmentary vertical section, on an enlarged scale, taken on line 5—5 of Figure 4 showing in full lines the trap closure in discharging position and dotted lines in closed position; and Figure 6 is a horizontal section taken on line 6—6 of Figure 5 looking in the direction of the arrows.

In the industrial use of dry fluent materials, where relatively small measured quantities must be successively and rapidly measured and delivered from a reservoir of the same, difficulty has been experienced in handling the material accurately and neatly as is oftentimes required in certain highly specialized industries. For instance, in the measuring of detonating materials for the loading of primers, percussion caps and the like, not only is great accuracy essential to meet the rigid specifications imposed on the manufacturers of such articles, but for the sake of safety great care must be taken to ensure against spillage of even any small amount of certain of these highly sensitive explosives since accumulations of relatively small increments of material might result in a fatal or serious accident. The apparatus of the present invention is intended to overcome any and all of the above difficulties and to provide for accurate measuring without spillage and for discharge of the measured quantity of material only in the presence of a receptacle beneath the measuring chamber for receiving the same.

The apparatus illustrated has proven satisfactory for the specific purpose mentioned but obviously is capable of considerable modification and re-arrangement of parts to serve for the measurement and discharge of other fluent materials in larger or smaller quantities and for various purposes. It is the intent to express in the claims sufficient scope to cover these obvious modifications.

Referring now to the drawings the apparatus is conveniently incorporated on a suitable base plate 10 which mounts a vertical standard 11 for supporting and providing guidance for parts which are adapted to reciprocate vertically without rotation thereon. The rod may be non-circular in cross-section or conveniently of circular cross-section and provided with a spline groove to restrain against rotation. An upper arm 12 and a lower casting member 14 are slidably mounted on the standard. To facilitate sliding the parts 12 and 14 are provided with non-ferrous bushings 15 and 16 respectively. A vertical post 17, spaced some distance from the standard 11, is mounted in the member 14 and connected to the arm 12, constraining them for simultaneous movement, and provides support and journals for the measuring plate or turret 20 and the bell crank 21, both of which will be later described.

The post 17 provides through the intermediate member 22 a support for the reservoir or hopper 24 adapted to contain a quantity of the dry fluent material which is to be measured and delivered.

The parts just described are all adapted for periodic reciprocation guided on the standard 11 and for the purpose of providing such movement a lever 25 is journalled intermediate its ends at 26 on the upright 27 secured to the base 10. The left-hand end of this lever passes closely beside the standard 11 and is connected by a link 30 to the member 14, being pivoted both to this member and to the lever as shown. Movement is imparted to the free end of lever 25 by a pair of sleeves 31 rotatably supported and spaced 180° apart on the face of a disk 32 carried by a shaft 33 appropriately journalled in a bearing member 34 on the top of a column 35 mounted on the base 10. As shown in Figure 3 this disk may be provided with a toothed periphery for engagement with a motor driven pinion or may have rotation applied thereto through the extension of the shaft as shown from any suitable source of power. The free end of lever 25 is offset as shown at 36 so that it is positioned to be engaged by either of the sleeves 31 upon rotation of the disk. The location of the lever below the horizontal diameter of the disk is such that contact between either sleeve 31 and the top surface of the lever occurs for considerably less than 180° of rotation of the disk. During this contact interval the assemblage of parts heretofore recited is moved throughout one cycle of elevation and lowering, two cycles taking place for each revolution of the disk 32.

The circular plate 20 is provided with an annular channel 38 in its upper face and extending from this channel to the flat bottom face are a plurality of vertical bores or traps 39 each of a different diameter in order to provide a choice for measuring a plurality of different volumes. These traps may be selectively positioned, for charging and discharging, by manual rotation of the plate 20 about the post 17, a flange 40 providing the support for the same and receiving the studs 41 for locking the plate in the selected position.

In order to charge the selected bore or trap of the proper size for the work in hand, a conduit 44 extends downwardly from the mouth of the reservoir or hopper 24 to the upper surface of the plate in the bottom of the channel 38. The mouth of the conduit is of larger diameter than the upper end or top port of each of the measuring bores and is adapted to have relative motion across such port once for each elevation of the measuring assembly. In the present case the plate 20 is stationary, except for its vertical movement, and the mouth of the conduit is traversed across the upper port of the bore by moving the same along the surface of the channel bottom in an arc, the trap being at the time closed at the bottom and adapted for charging from the material flowing through the conduit. Charging occurs during each movement of the mouth over the trap, irrespective of direction.

It is preferred to maintain the reservoir 24 stationary and to provide a flexible conduit 44 and for this purpose a rubber tube serves admirably. If some other type of conduit is selected then at least the mouth of the same which engages the surface of the measuring plate should be rubber to provide a close resilient fit with the surface of the plate and prevent the possibility of the leakage of any grains of the material from around the mouth of the conduit. The combination of the rubber conduit mouth and the metal measuring plate ensures against accidental explosions, provides for a clean wiping of the plate on each movement of the conduit mouth, ensures a uniform filling of the measuring trap, and largely eliminates wear.

Lateral arcuate movement is imparted to the mouth of the conduit 44 under the action of the bell crank lever 21, previously mentioned, to which it is attached as shown. This lever is journalled on the post 17 and supported between helical springs 47 and 48 engaged respectively between this lever, the collar 50, and the measuring plate 20, as clearly shown in Figure 1. These springs provide a floating mounting for the bell crank lever and permit of adjustment to give the desired pressure to the mouth of the conduit. The bell crank lever is actuated to sweep the mouth of the conduit from the position shown in Figure 3 to one in which it has the same arcuate displacement to the opposite side of the cooperating measuring trap by the link 60, best shown in Figure 3, having suitable universal connections 61 to the other arm of the bell crank lever. The link is offset and its remote end is journalled on the eccentric pin 62 carried on disk 63 supported on shaft 33 beyond the disk 32. Obviously for each full revolution of the shaft the mouth of the conduit will be swept across the measuring trap twice, once in each direction of movement which corresponds in number to the lifting and falling phases of movement of the assemblage under the action of the sleeves 31 on the lever 25.

It will be seen that the charging operations for the measuring trap are synchronized with the lifting movements of the assemblage and are so phased that the actual registration of the conduit mouth and the upper port of the trap takes place near the top of the lifting movement. The mouth is fully out of register with the trap long before the measuring plate reaches its lowermost position.

In order to guide the discharged fluent material into a desired receptacle and to prevent its discharge from the trap in the absence of such receptacle, there is provided a funnel-like element 65 which is movably mounted beneath the lower end of the trap by supporting arms 66 secured to the funnel and pivoted at 67 to the member 14.

The trap is normally closed during the filling operation and most of the downward movement of the filling assembly by means of a closure plate 70 best seen in Figure 5. This plate is pivoted at 71 between suitable furcations on the member 14 so that it may fit tightly against the bottom face of the measuring plate 20 to close the lower port of the trap. An extension 74 beyond the pivot 71 provides for attachment of the link 76 for operating the closure plate. This link extends down and is pivoted to a tongue 77 extending from the funnel 65. When the funnel is in its repose or lowermost position such as shown in Figure 2 its weight, pulling down on the link 76 and the arm 74 extending from the closure plate, presses this closure plate tightly against the undersurface of the measuring plate and closes the trap against any leakage whatsoever. If there is relative lifting movement so that the funnel approaches closer to the undersurface of the measuring trap plate the closure plate is moved to the position shown in Figure 5 and allows the trap to discharge into the funnel as illustrated.

The apparatus illustrated is intended to load small primers each of which is mounted in a jig or holder 80 and these holders are adapted to be fed one by one beneath the measuring apparatus in timed relation to the vertical reciprocation of the same, each holder being moved into position while the measuring apparatus is at the upper part of its cycle of movement. It sometimes happens that the jig which will hereinafter be called a receptacle is not in position on the delivery mechanism and if means were not provided to prevent such occurrence the powder would be discharged with no receptacle for the same and might be the cause of accidents. The receptacles are of such height and are so positioned that when they are properly beneath the funnel the same is prevented from moving to its lowest repose position along with the measuring assembly. It is stopped on its downward movement while the assembly continues, causing pressure on the link 76 to open the bottom closure plate and allow discharge of the measured material from the trap. In the absence of a receptacle, however, the measuring funnel remains in its repose position at a uniform and maximum distance below the measuring plate and no discharge of material takes place. The material remaining in the trap prevents any additional flow from the conduit on the next movement of the mouth of the same across the trap port on the upstroke of the assembly. On every upstroke an effort is made to charge the trap but if it has not been previously discharged, no fluent material changes place.

Any suitable mechanism may be provided for indexing or advancing the receptacles to receive the measured charges of material.

Having thus described the invention, what is claimed as new and desired to secure by Letters Patent is:

1. In a volumetric measuring and delivering device for handling explosive powders, in combination, a hopper for the powder, a horizontal plate below said hopper having a measuring passage extending entirely through the same, a conduit extending from the interior of said hopper to the upper face of said plate and having a soft, non-abrasive mouth relatively movable over the face of said plate to periodically register with said passage, means for vertically reciprocating said plate a movable closure for the bottom of said plate passage, and means actuated by the presence of a stationary receptacle beneath the passage to open said closure subsequent to each filling of the passage, and upon the downward movement of said plate.

2. In a volumetric measuring and delivering device for handling explosive powders, in combination, a hopper for said powder, a volumetric measuring trap, means to periodically fill said trap with said powder from said hopper, a bottom closure for said trap, a delivery funnel mounted beneath said closure for substantially vertical movement relative to the trap, and means associating said funnel and closure to open the latter on vertical displacement of the funnel from its repose position.

3. In a volumetric measuring and delivering device for fluent materials, in combination, a volumetric measuring trap a hopper for said fluent material, means to periodically fill said trap with said material from said hopper, a movable bottom closure for said trap, a delivery funnel beneath said closure and mounted for vertical displacement from a repose position to one closer to the closure upon engagement with a receptacle for a charge of fluent material, and a connection between said funnel and closure to maintain the latter closed when the funnel is in the repose position and to open the same when the funnel is in its lifted position.

4. In a volumetric measuring and delivering device for fluent materials, in combination, a measuring trap, means to periodically associate said trap with a source of material to load the same, a movable bottom closure for said trap, a delivery funnel beneath said closure and mounted for displacement from a repose position to a delivery position upon engagement with a receptacle for a charge of said fluent material, a connection between said funnel and closure to maintain the latter closed in the repose position of the former and to open the same when the funnel engages a receptacle, means to elevate the trap and associated parts during the filling operation and to subsequently lower the same, and means to feed a receptacle beneath the funnel when the said parts are raised.

5. In a volumetric measuring and delivering device for fluent materials, in combination, a measuring trap, means to periodically associate said trap with a source of material to load the same, a movable bottom closure for said trap, a delivery funnel beneath said closure and mounted for vertical displacement from a repose position to one closer to the closure upon engagement with a receptacle for a charge of fluent material, a connection between said funnel and closure to maintain the latter closed when the funnel is in the repose position and to open the same when the funnel is in its lifted position, and means synchronized with said periodic means to elevate and then lower the trap, funnel, and associated parts.

6. In a volumetric measuring and delivering device for fluent materials, in combination, a measuring trap, means to periodically associate said trap with a source of material to load the same, a movable bottom closure for said trap, a delivery funnel beneath said closure and mounted for vertical displacement from a repose position to one closer to the closure upon engagement with a receptacle for a charge of fluent material, a connection between said funnel and closure to maintain the latter closed when the funnel is in the repose position and to open the same when the funnel is in its lifted position, means synchronized with said periodic means to elevate and then lower the trap, funnel, and associated parts, and means to feed a receptacle beneath the funnel each time it is elevated.

7. In a device of the type described, in combination, a base, a vertical standard providing support and guidance, a member vertically and non-rotatably slidable on said standard, a measuring trap carried by said member and having a top filling port and a bottom discharge port, a reservoir for fluent material, a conduit extending from the interior of said reservoir and having a mouth adjacent said trap, means to periodically register said mouth and filling port to charge the trap, a hinged bottom cover for said trap, a funnel beneath said cover for guiding the discharge from said trap, means hinging said funnel to said member for substantially vertical movement relative thereto, a connection between said cover and funnel whereby the cover is held closed by the weight of the funnel, means synchronized with said registering means to vertically reciprocate said member and associated parts, and means to deliver a receptacle beneath said funnel when the same is lifted with said member, said receptacle being of such height as to cooperate with said funnel to move it relative to said member.

8. In a device of the type described, in combination, a plate providing a measuring trap, charging means for said trap including a reservoir for fluent material means supporting said plate, means to periodically vertically reciprocate said supporting means, means movable with said plate to associate said trap with said charging means once per cycle of reciprocation, a movable closure plate carried by said supporting means, means adapted to position said plate to close the bottom of said trap at least during charging, and means associated with said closure plate to open the same, said last mentioned means being positioned and constructed to be actuated by the presence of a receptacle beneath said trap.

9. A device as claimed in claim 8 in which said plate is provided with a plurality of traps of different volumetric capacities, and means to selectively position any one of the same in cooperating relation to the charging means and closure plate.

10. In a device of the type described, in combination, a plate providing a measuring trap, means supporting said plate, means to periodically vertically reciprocate said supporting means, means movable with said plate to associate said trap with charging means once per cycle of reciprocation, a movable closure plate carried by said supporting means, means adapted to position said plate to close the bottom of said trap at least during charging, means associated with said closure plate to open the same, said last mentioned means in its repose position holding said plate closed, means to move a charge receiving receptacle beneath said plate when said supporting means is elevated, said receptacle being of such height as to engage and prevent the lowering of the closure opening means for its full stroke under the action of the reciprocating means, engagement of said operating means with a receptacle serving to open the closure.

JOHN F. JOHNSON, Jr.